(12) United States Patent
Kirchoff

(10) Patent No.: US 10,360,232 B2
(45) Date of Patent: Jul. 23, 2019

(54) SEMANTIC MAPPING OF DATA FROM AN ENTITY-RELATIONSHIP MODEL TO A GRAPH-BASED DATA FORMAT TO FACILITATE SIMPLIFIED QUERYING

(71) Applicant: Marc Kirchoff, Dresden (DE)

(72) Inventor: Marc Kirchoff, Dresden (DE)

(73) Assignee: SAP SE, Walldorf (DE)

( * ) Notice: Subject to any disclaimer, the term of this patent is extended or adjusted under 35 U.S.C. 154(b) by 555 days.

(21) Appl. No.: 13/936,623

(22) Filed: Jul. 8, 2013

(65) Prior Publication Data

US 2015/0012561 A1    Jan. 8, 2015

(51) Int. Cl.
*G06F 16/25*    (2019.01)

(52) U.S. Cl.
CPC .................. *G06F 16/258* (2019.01)

(58) Field of Classification Search
CPC .................................................. G06F 16/258
See application file for complete search history.

(56) References Cited

U.S. PATENT DOCUMENTS

| | | | |
|---|---|---|---|
| 8,533,182 B1* | 9/2013 | Charboneau | G06F 16/90335 707/718 |
| 2007/0220000 A1* | 9/2007 | Walsh | G06F 12/0842 |
| 2008/0201234 A1* | 8/2008 | Castro | G06F 16/972 705/26.1 |
| 2008/0250426 A1* | 10/2008 | Hepworth | G06F 9/5055 719/315 |
| 2009/0063555 A1* | 3/2009 | Fisher | G06F 17/30595 |
| 2009/0265684 A1* | 10/2009 | Fuchs | G06F 8/10 717/105 |
| 2014/0310302 A1* | 10/2014 | Wu | G06F 16/2453 707/769 |

\* cited by examiner

*Primary Examiner* — Van H Oberly
(74) *Attorney, Agent, or Firm* — Sterne, Kessler, Goldstein & Fox P.L.L.C.

(57) ABSTRACT

Methods and systems that allow of mapping data stored in a first format to a second format is provided. According to the method a data object to be mapped is identified. The object may have a particular type associated with it and one or more associated properties. A unique identifier can be generated for the based on the type of the first object. According to some embodiments, the unique identifier may contain information that can be used to retrieve the object when it is stored in the first format. One or more of the properties associated with the first can be mapped to a resource associated with the unique identifier and also with a second format. The first object can then be queried using a query language associated with the second format.

26 Claims, 14 Drawing Sheets

SEMANTIC MAPPING OF DATA FROM AN ENTITY-RELATIONSHIP MODEL TO A GRAPH-BASED DATA FORMAT TO FACILITATE SIMPLIFIED QUERYING

BACKGROUND

Technical Field

This disclosure relates systems and methods that allow data stored in an entity-relationship model to be mapped to a graph-based data format and/or queried using a query language associated with the graph-based data format.

Related Art

Most of the mid-size and large companies employ enterprise resource planning (ERP) systems to manage their business data and business processes. These ERP systems store business information (e.g., purchase orders, equipment inventories, customer information, or the like) that can be represented as business objects (stored in, for example, an entity data model (EDM) format in ERP systems). Multiple business objects can span a business object graph by referencing each other. For instance, a purchase order might reference customer information or vice versa. However, searching for these "related" business objects can sometimes prove difficult. For instance, to find all objects that are related to each other, a user might have to conduct multiple complex queries using the query language that is provided by the system.

There are also query languages that are normally associated with a different format of data that produce the same results at the complex queries discussed above, but that require simpler queries. For example, SPARQL, which is a query language associated with data stored in a Resource Description Framework (RDF) format would allow queries of all objects that are related to each other without the need for the multiple complex queries described above. It would, therefore, be desirable to use a second kind of query language (e.g., SPARQL) to query data objects stored in a format not normally associated with that query language.

BRIEF SUMMARY

According various embodiments, a method of mapping an object stored in a first format to a second format is provided. According to the method an object to be mapped is identified. The object may have a particular type associated with it and one or more associated properties. A unique identifier can be generated based on the type and the key of the first object. According to some embodiments, the unique identifier may contain information that can be used to retrieve the object when it is stored in the first format. One or more of the properties associated with the first can be mapped to a resource associated with the unique identifier and also with a second format. The first object can then be queried using a query language associated with the second format.

A system may also be provided according to various embodiments. The system may include memory and one or more processors configured to map an object stored in a first format to a resource associated with a second format.

Further features and advantages of embodiments, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments will now be described, by way of example only, with reference to the accompanying schematic drawings in which corresponding reference symbols indicate corresponding parts. Further, the accompanying drawings, which are incorporated herein and form part of the specification, illustrate embodiments, and, together with the description, further serve to explain the principles of the disclosure and to enable a person skilled in the relevant art(s) to make and use the disclosed embodiments.

Figure 1:
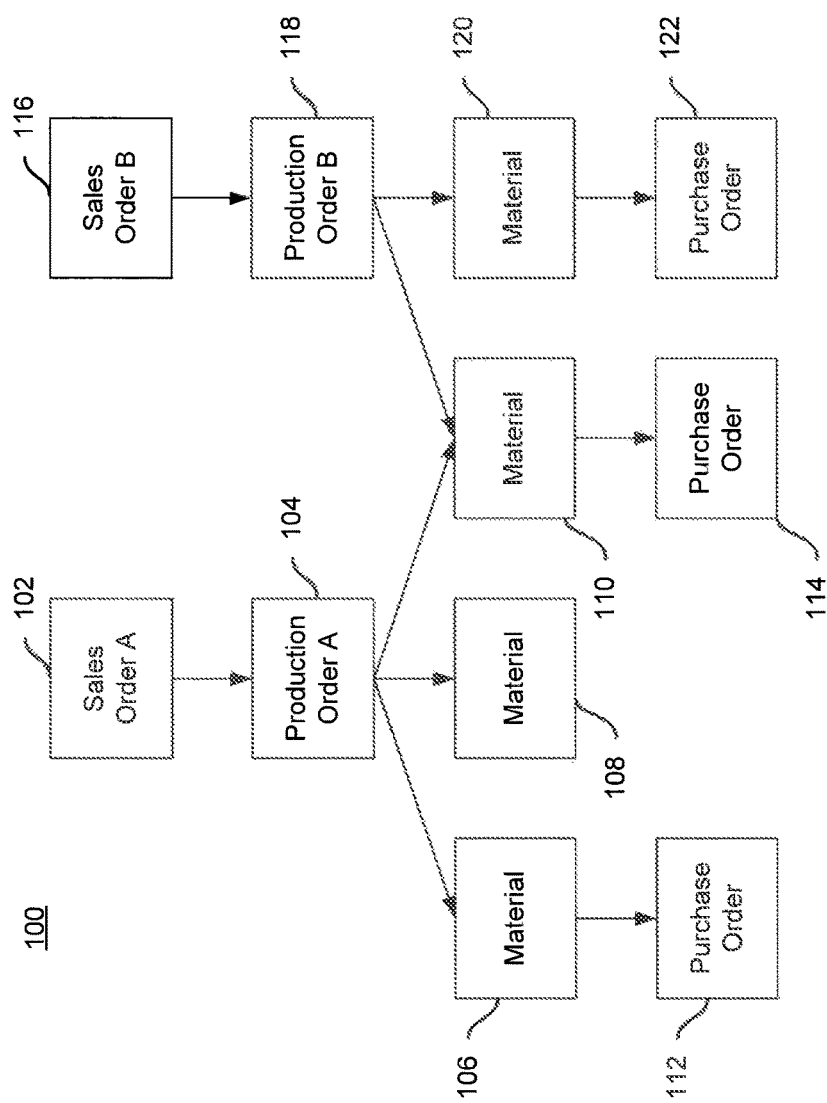
FIG. 1 depicts an object graph according to various embodiments.

The features and advantages of embodiments of the present disclosure will become more apparent from the detailed description set forth below when taken in conjunction with the drawings. In the drawings, like reference numbers generally indicate identical, functionally similar, and/or structurally similar elements.

DETAILED DESCRIPTION

This specification discloses one or more embodiments that incorporate the features of this disclosure. The disclosed embodiment(s) merely exemplify the present disclosure. The scope of the present disclosure is not limited to the disclosed embodiment(s). The present invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

A number of companies use enterprise resource planning (ERP) systems to manage different kinds of information. Within ERP systems, business information like purchase orders, contracts, materials, etc. can be represented as business objects. Business objects hold a set of attributes (name, description etc.) and associations to other business objects. Using the associations between several business objects, a graph can be created such as shown in FIG. 1, FIG. 1. depicts a simplified business object graph 100 created within an ERP system as part of two sales order processes 102 and 116.

As shown in FIG. 1, two sales orders 102 and 116 are extant in the graph 100. Sales order A 102 is associated with production order A 104, which in turn is associated with materials 106, 108, and 110. For instance, materials 106, 108, and 110 might be required to fulfill production order 104. Assuming, for the example, that the supplies of materials 106 and 110 are depleted and that more must be purchased before production order A 104 can be fulfilled. This will require a purchase order 112 for material 106 and a purchase order 114 for material 110 be sent, to external suppliers.

Similarly, to sales order A, sales order B 116 results in production order B 118, which requires materials 110 and 120. As both of materials 110 and 120 are depleted, purchase order 114 and 122 can be issued for them. Since both of production order A 104 and production order B require material 110, the purchase order 114 has been combined for both order 104 and 118. Additionally, if the external supplier for purchase order 114 is unable to fulfill the purchase order, it will affect both of production order A 104 and production order B 118. In such a situation it would, therefore, be desirable to query other objects (e.g., production orders and sales orders) are affected by the failure of the supplier to fulfill purchase order 114 so that production schedules can be adjusted, clients informed, etc. Querying information about business objects with regard to their relation to other business objects can be difficult using the query languages native to the format in which the objects of graph 100 are stored. This difficulty is described in greater detail, below, with respect to FIG. 2.

Figure 2:
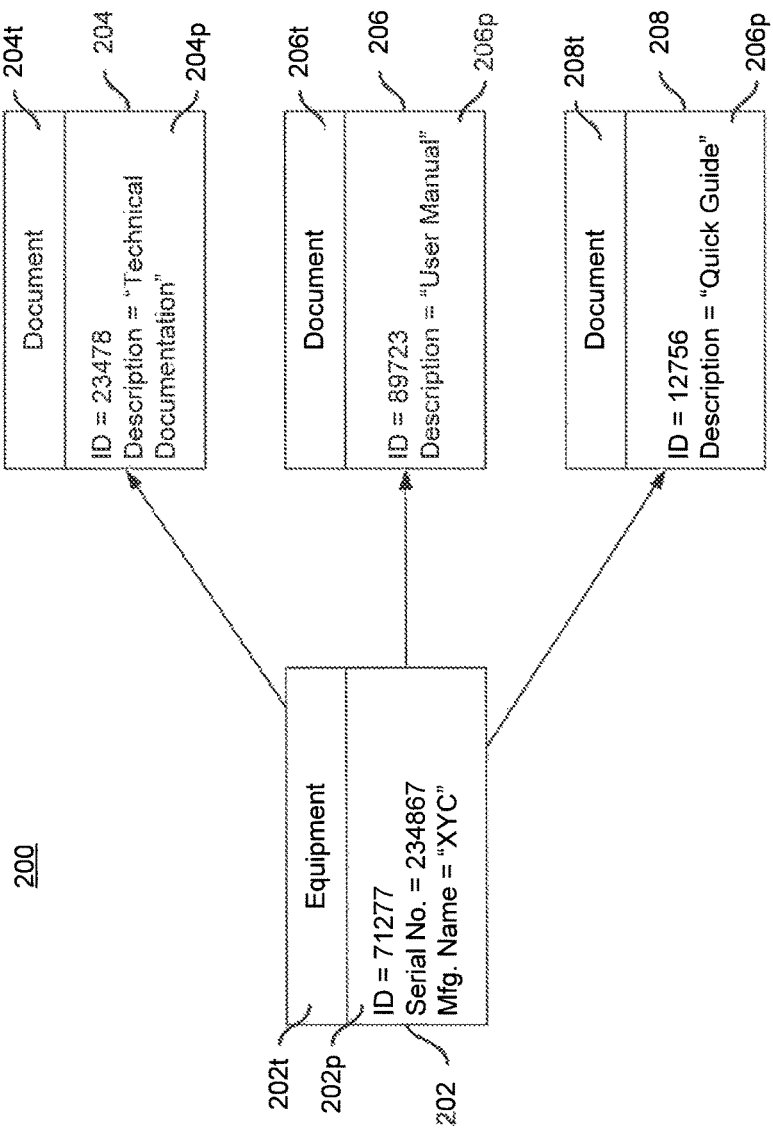
FIG. 2 depicts of an object graph according to various embodiments.

FIG. 2 depicts another simple business object graph 200 according to various embodiments. In particular, FIG. 2 depicts several objects 202, 204, 206, and 208 that are presented in an entity data model (EDM) format. For simplicity, only two types of objects are shown: equipment type and document type. As indicated, object 202 has a type 202t of equipment. Similarly, objects 204, 206, and 208 have types 204t, 206t, and 208t of document. The equipment object 202 has document objects 204, 206, and 208 associated with it. Furthermore, each of objects 202, 204, 206, and 208 has several different properties 202p, 204p, 206p, and 208p associated with it. For instance, the equipment object 202 has properties 202p that include an ID number, a serial number, and the name of the equipment's manufacturer. Similarly, the document objects 204, 206, and 208 each have properties 204p, 206p, and 208p that include an ID number and a description.

In the Example of FIG. 2, a user wishing to query the documents associated with equipment object 202 must first retrieve the internal ID of the equipment (specified by, e.g., the serial number and/or the name of the manufacturer) before identifying the documents 204, 206, and 208. That is, two different web service calls are necessary to retrieve this ID using an enterprise data service. With the equipment ID of object 202, another web service can be called to get the IDs of the attached documents 204, 206, and 208. The descriptions of the documents can be queried by a service provided by the document business objects 204, 206, and 208 using the IDs as input. This simple query involves only two business object types (Equipment and Document) but it requires at least four different data service invocations to be executed. Queries that involve more business object types, (e.g., the query described with respect to FIG. 1), result in even more complex service orchestrations.

The query language provided by the system requires too much complexity in order to retrieve business objects with regard to their position within an object graph. However, other query languages would make this task easier. For instance, the resource description framework (RDF) query language, SPARQL, allows the expression of such queries in much more compact and intuitive way. Listing 1 shows the SPARQL query for the business object graph in FIG. 2. Instead of almost 100 lines of code that are necessary to call the four different web service and filter the results, the whole query can be expressed as a single, very short SPARQL query. Another advantage is that the developer does not have to "guess" the relations between the different business objects because they are made explicit by the ontology. As SPARQL is a graph-based query language it is also better suited for querying business object graphs than SQL, which is based on the relational model. Specific queries can be expressed in a much more compact and intuitive way (e.g., if the length of the path between two nodes is unknown).

Listing 1: SPARQL query to request the document descriptions.

```
SELECT ?desc
WHERE {
    ?equ rdf:type boo:Equipment .
    ?equ boo:hasManufacturerSerialID 234867 .
    ?equ boo:hasManufacturerName "XYC" .
    ?equ boo:hasDocument ?doc .
    ?doc boo:hasDescription ?desc }
```

Figure 3A:
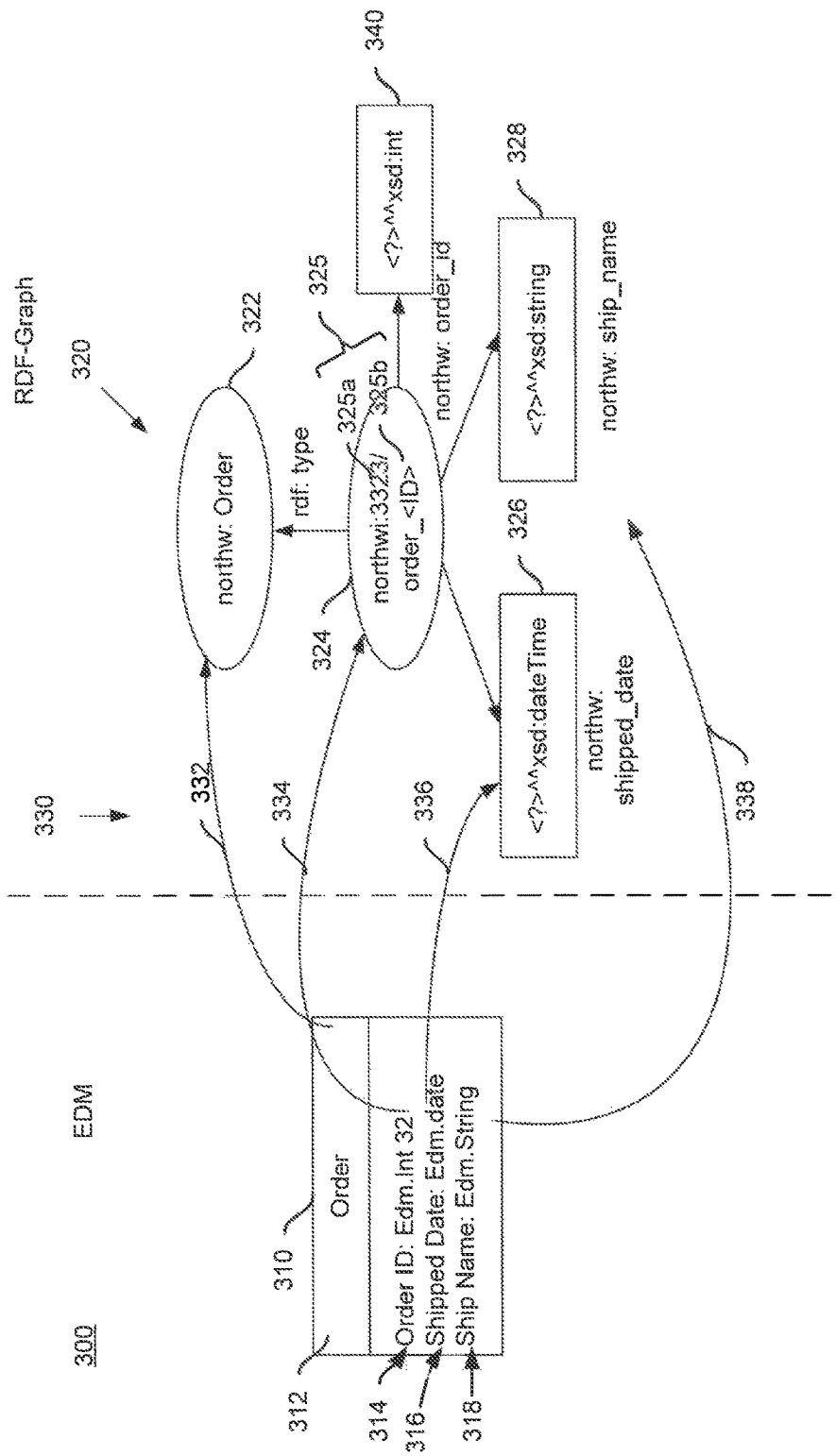
FIGS. 3A and 3B depict a mappings of an object stored in a first format to a graph associated with a second format according to various embodiments.

Thus, it can be seen that there can be advantages to allowing querying of objects stored in a first format (e.g., EDM) using a query language normally associated with a second format (e.g., SPARQL). However, in order to do this, the objects of stored in the first format must be mapped to the second format. FIG. 3A shows such a mapping 300 of an object 310 stored in one format to a graph 320 of a second format according to various embodiments. The exemplary formats used in FIG. 3A are used only to illustrate the principle of operation and should not be construed to limit the scope of the present disclosure.

In the example of FIG. 3A, the object 310 is depicted as an entity data model (EDM) formatted object of having a type 312 of "order." Additionally, the object 310 has several properties including an order ID 314, a shipped date 316, and a ship name 318. As shown, graph 320 maps a resource 324 having several fields or properties associated with it 326, 328, and 340.

In FIG. 3A, the each property of the object 310 is mapped to a corresponding field associated with resource 324 in RDF graph 320 according to specific mappings 330. For instance, mapping 332 maps the type "Order" of object 310 to the corresponding type 322 associated with resource 324. This could take the form of mapping the EDM type 312 "Order" to an RDF resource of the type 322 of "northw: Order." Additionally, a unique identifier 325 must be assigned to each resource 324. According to some embodiments, the identifier of the object 310 (which uniquely identifies the object within the object set, e.g., Order ID 314) in conjunction with an identifier of the corresponding object set 325*a* can be mapped to the unique identifier 325. For example the identifier 325 can be generated by replacing the value of order_<ID> 325*b* with the value of the Order ID 314. Similarly, the properties Shipped Date 316 and Ship Name 318 of object 310 can be mapped to appropriate RDF statement templates 326 and 328 with the predicates, northw:shipped_date, and northw:ship_name, respectively, by mappings 336 and 338. Once mapped, the EDM object 310 can be queried using an RDF-associated query language such as SPARQL.

Because that EDM formatted objects are described using common schema definition language (CSDL) as part of a Service Metadata Document, example will continue by defining the semantic as an extension of CSDL. The extensions necessary to describe the mapping shown in FIG. 3A will be explained in below. Though this should not be viewed as limiting the disclosure to this particular CSDL scheme.

SPARQL queries are built on basic graph patterns which consist of triple patterns. A triple pattern is an RDF statement at which the subject, predicate, and object might be replaced by variables. Triple patterns and basic graph patterns describe the structure of the RDF sub-graphs (e.g., 320) that should be part of the solution.

By way of example, a triple pattern that matches all resources having the type northw:Order is defined by the following expression: ?order rdf:type northw:Order. This expression can also be used as part of the semantic description to specify the mapping from a specific object type to a resource template. By contrast, with CSDL an EntityType-element is provided to define object types. In order to describe the mapping from a specific object type to an RDF resource, this element is extended by the attribute sem: Mapping. The sem-prefix is bound to a namespace which acts as a container for all the extension elements defined. The value of this attribute is made up of the basic graph pattern that describes the mapping from the object type to the RDF triples. Listing 2 shows the semantic extension of the object type Order. This extension states that for each object of this type the RDF triples described by the triple pattern are created. The variable ?order is replaced by an automatically generated resource identifier (e.g., a uniform resource identifier (URI)). The structure of this URI will be explained below.

---

Listing 2. Semantic extension of an object type.

1. <EntityType Name= "Order"
2. sem:Mapping= "?order rdf:type northw:Order">
3. ...
4. </EntitType>

---

To describe the mappings from the properties of the object type to the RDF statements, the Property-element of CSDL is also extended with the sem:Mapping-attribute. As an example, Listing 3 shows the extension of the OrderDate-property. The dollar sign acts as a placeholder for the value of the property.

---

Listing 3. Semantic annotation of a Property-element.

1. <Property Name="OrderDate"
2. Type="Edm.DateTime" Nullable="true"
3. sem:Mapping="?order northw:shipped_date $" / >

---

It should be possible for the service provider to specify the schema of the resource identifiers that are automatically created by the system. However, according to some embodiments, the scheme for specifying the identifier 325 is not fully arbitrary. That is, the identifier 325 can contain the information necessary to retrieve the corresponding object 310. For instance, each object 310 can have a unique identifier (which contains the object key, e.g., 314) that can be used to query it. According to some embodiments, it is possible to derive the identifier of the object from the identifier 325. This can be accomplished by inserting a hash value of the object identifier into the identifier 325, according to various embodiments. However, if an ERP system stores a large amount of data, this can result in a very large mapping table. According to some embodiments, as described above, a hash value of a part of the object identifier 325*a* can be combined with object key 314 (mapped to 325*b*) to form a corresponding template identifier 325.

Thus, according to some embodiments, resource 324 is uniquely identified by the object key and the entity-location-id which is a hash value of the object identifier without the object key. Every object within a specific object set has the same entity-location-id. The entity-location-id 325*a* in conjunction with the object key 325*b* allows the determination of the object identifier. Since the number of object sets is usually smaller when compared to the number of the entities, the resulting mapping table will be smaller if the entity-location-id is used than a corresponding mapping table using the hash value of object identifier.

Figure 3B:
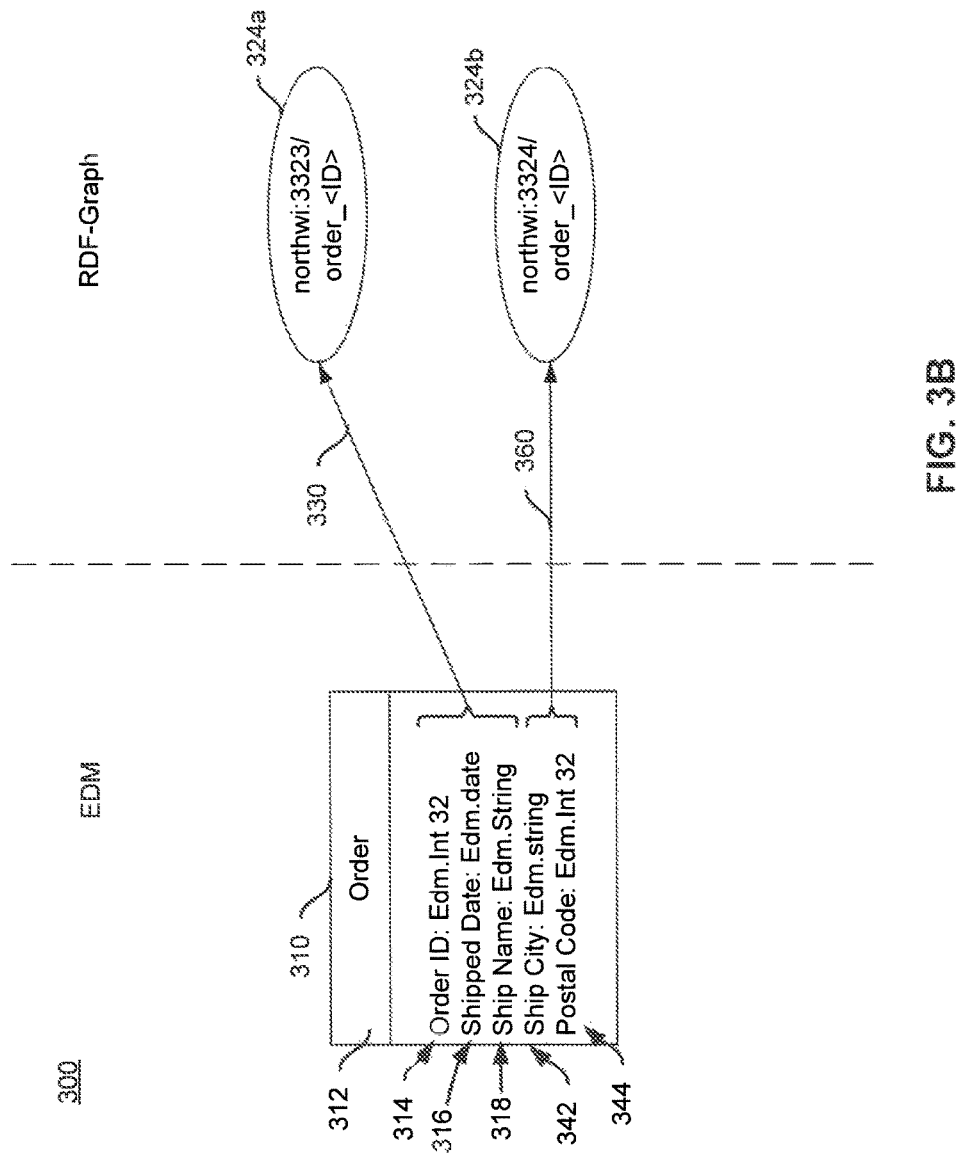

According to some embodiments, it is possible to define a mapping from one object to several templates. For instance, assume that in addition to the properties 314, 316, and 318 that object 310 is shown in FIG. 3A as having, object 310 also had properties to specify the shipping address, such as ShipCity, ShipPostalCode. According to various embodiments, these can be mapped to a different template than the other properties. For instance, as shown in FIG. 3B, the order ID 314, shipped date 316, and ship name 318 properties are all mapped to the resource 324*a*, as described above using mapping 330. However, the Ship City property 342 and the Postal Code property 344 are mapped to a different resource 324*b* using mapping 360. This different template 324*b* can have a different key associated with it and, therefore, a separate unique identifier will be generated for it according to various embodiments.

According to some embodiments, it may be desirable to map two properties of object 312 to a single template property. For example, assume an object having a type Employee containing two properties to denote the name of the employee: FirstName and LastName. In some instances, it may be desirable to a single statement in the corresponding template having, for example, the predicate northw:name. The object of this statement is made up of the concatenated properties. In order to describe this mapping there must be a way to specify how these properties should be concatenated. In general terms, it must be possible to specify the operation that should be executed on the properties to calculate the object of the statement. As the mapping involves more than one property it should be specified as part of the semantic annotation of the object type. The properties can be referenced by their name. To distinguish references to properties from resource variables, literals and resources they start with the dollar sign. Based on these considerations, the mapping of the FirstName- and LastName-property can be specified with concat-operation defined in the XPath-functions namespace (fn): ?employee northw:name fn:concat($FirstName, ' ', $LastName). The SPARQL syntax in conjunction with the property reference mechanism and the XQuery-/XPath-operations allow the definition of mappings that cover most of the RDF concepts, such as blank nodes, containers and collections. As an example, Listing 4 shows a more complex mapping definition that involves the RDF reification vocabulary. The property ShippedDate is mapped to a statement with the predicate northw:shipped_date. In addition, a reification of this statement is generated that provides information about the creation time of the statement by using the current-date-function.

Listing 4. Definition of a mapping including reification.

1. <EntitType Name="Order"
2. sem:Mapping="?order rdf:type northw:Order">
3. <Property Name="ShippedDate"
4.   Type="Edm.DateTime"
5.   sem:Mapping="?order northw:shipped_date $ .
6.     ?state rdf:type rdf :Statement .
7.     ?state northw:created_on fn:current-date ( ) .
8.     ?state rdf:subject ?order .
9.     ?state rdf:predicate northw:shipped_date .
10.    ?state rdf:object $" />
11. </EntityType>

According to some embodiments it is possible to define collections and/or containers of templates and/or template properties. A mapping of properties to the elements of a container can be defined with the concepts already introduced. To describe a mapping based on the navigation properties, a special construct is needed that acts as a placeholder for the consecutively numbered container membership predicates (rdf:_1, rdf:_2, . . . ): sem:con_item. With this element it is, for example, possible to map all orders that are associated with a customer to a container by extending the sem:Mapping-attribute of the Customer-object type with the following expression: ?customer northw:orders [rdf:type rdf:Bag; sem:con_item ?order]. By way of example, SPARQL provides a special syntax to represent collections. In conjunction with the property reference mechanism explained above this syntax can be used to describe the mapping to a collection, e.g., ?order northw:ship_address ($ShipAddress $ShipCity $ShipPostalCode $ShipCountry).

Figure 4:
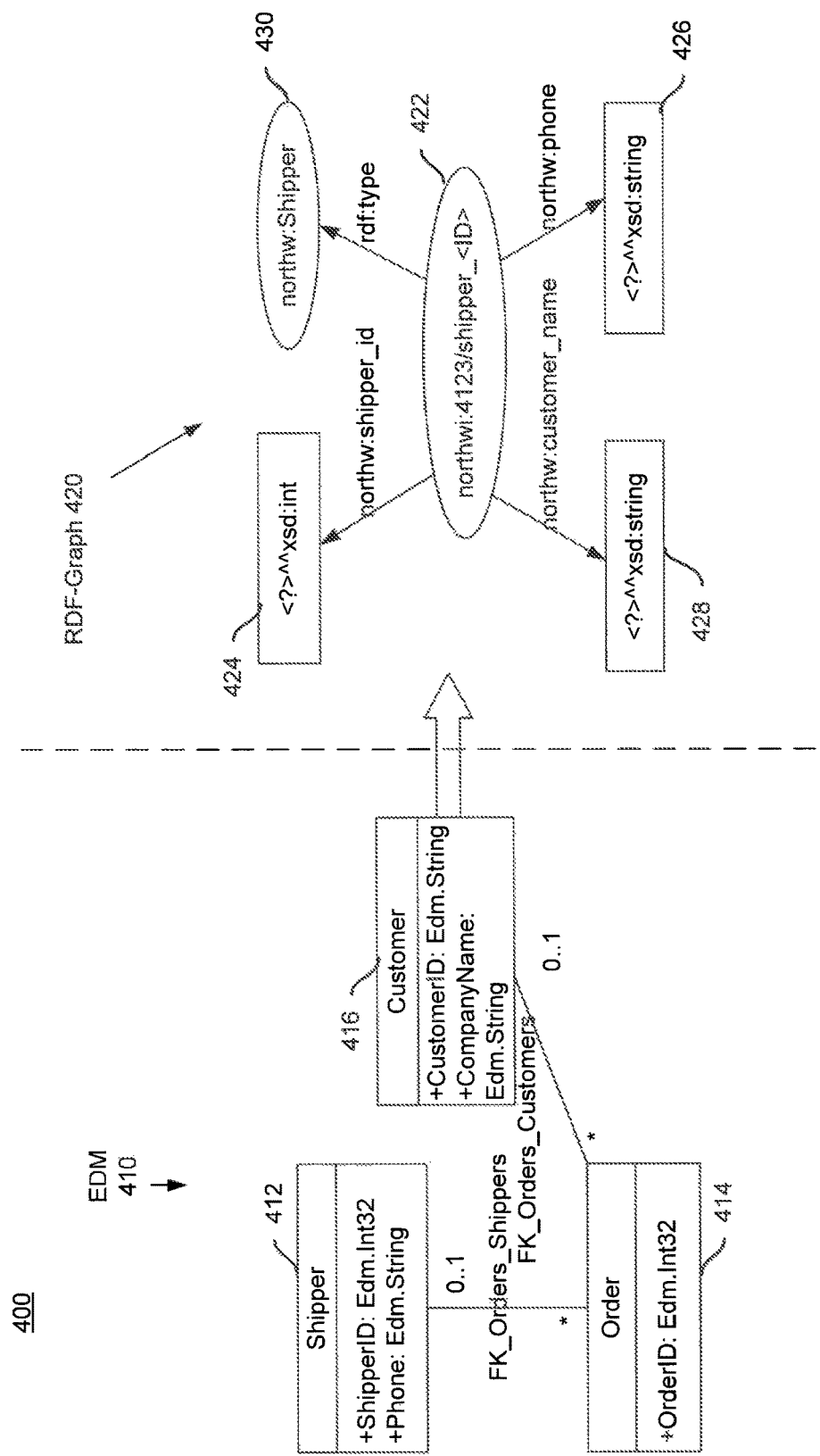
FIG. 4 depicts the mapping of properties of multiple objects stored in a first format to a graph associated with a second format according to various embodiments.

As shown in FIG. 4, Objects of different types can be related to each other within an Entity Data Model (EDM) 410. For instance, FIG. 4 depicts that how shipper object 412 is related order object 414 and customer object 416. Object 412 of type Shipper can be mapped to one resource 422 with the type northw:Shipper as discussed above with respect to FIG. 3A. That is, the shipper object 412 type can be mapped to the template type 422, and the shipper object 412 properties (Shipper ID and phone number) can be mapped to corresponding properties 424 and 426 for the template 420.

In the example given in FIG. 4, however, it may also be desirable to map properties from objects related to the shipper object 412 (i.e., objects 414 and 416) to resource 422 in graph 420. For instance, for each customer object 416 that is connected to a specific Shipper object 412 via an Order object 414, an appropriate field (e.g., 428) can be created and associated with resource 422. For instance, the property CompanyName from object 416 mapped to a statement with the predicate northw:customer_name to field 428 associated with resource 422.

To describe such a mapping, the object type Shipper and its properties have to be semantically annotated as explained in previous sections. To involve the CompanyName property of the Customer-object 416 type it is sufficient to extend this property with the following attribute: sem:Mapping="?shipper northw:customer_name $". The navigation properties involved in the mapping are automatically determined by the system. The mapping to a specific resource 422 is based on the object type that contains the rdf:type-definition of the corresponding variable. If the same variable is used in the semantic annotations of another object type that is related to the initial object type the mapping is defined by the shortest connection between these two object types in terms of the number of intermediate navigation properties. According to some embodiments, there can be more than one connection between two object types.

Figure 5:
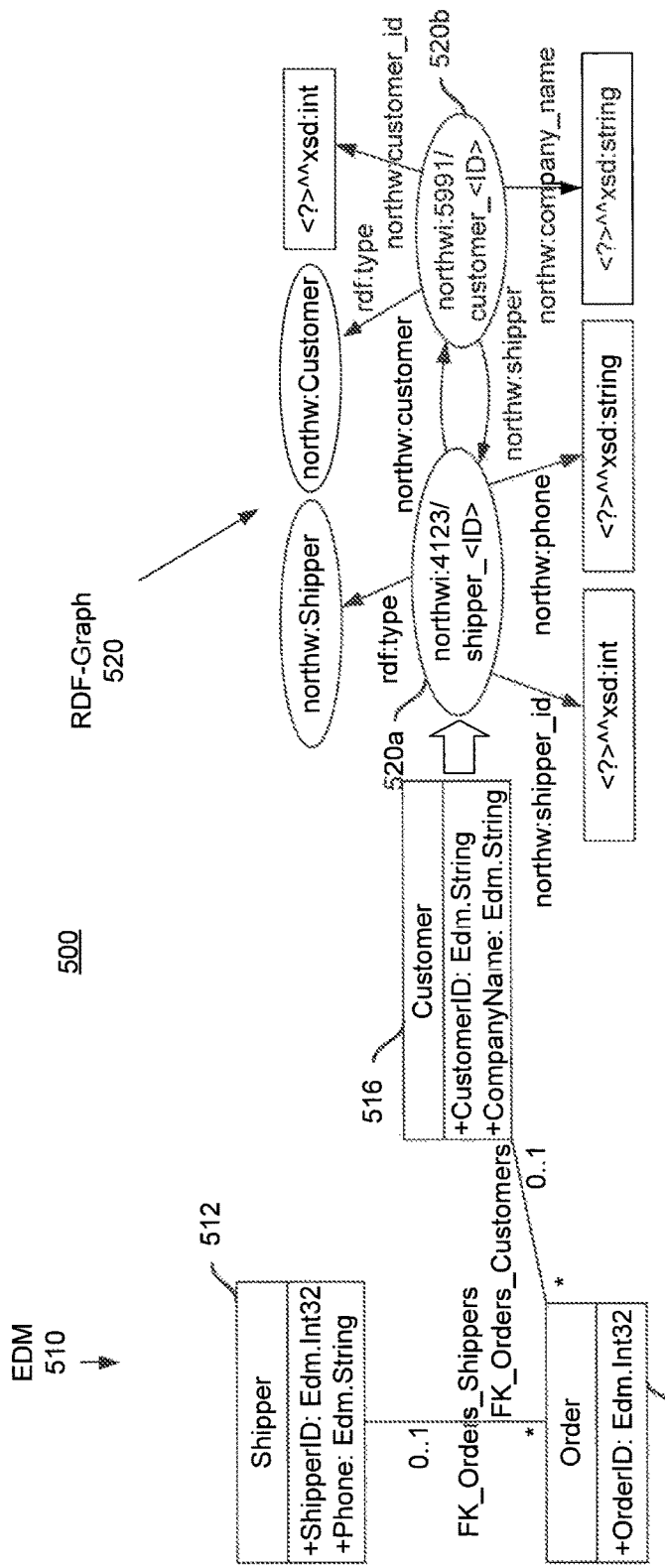
FIG. 5 depicts the mapping of properties of multiple objects stored in a first format to a graph associated with a second format according to various embodiments.

In addition to mapping several related objects (e.g., objects 412, 414, and 416) to one resource 422 as shown in FIG. 4, it is also be possible to define a mapping 500 to several resource templates 520a and 520b that are connected to each other, as shown in FIG. 5.

Each Shipper-object is mapped to a northw:Shipper-resource and each Customer-object is mapped to a northw:Customer-resource. Similarly to FIG. 4, the example depicted in FIG. 5 contains an EDM 510 having several objects 512, 514, and 516 that are associated with each other. Specifically, the EDM 510 contains a shipper object 512, an order object 514, and a customer object 516. The example shown in FIG. 5 differs from that in FIG. 4 because two resources 520a and 520b have been defined. Specifically, resource 520a has been defined so that the shipper object 512 can be mapped to it. Similarly, the customer object 516 can be mapped to resource 520b in a manner substantially similar to what has been already described. For instance, the entities, which are connected via an Order-object, can be connected with corresponding resource templates 520a and 520b with two additional statements with the predicates northw:customer and northw:shipper.

As in the previous example, there are two possibilities to describe such a mapping 500. The first one is to extend the semantic annotation of the object types with the templates of the triples that connect the resources. For instance, the semantic annotation of the object type Shipper could look like this: sem:Mapping="?shipper rdf:type northw:Shipper. ?shipper northw:customer ?customer". Again, the navigation properties involved in the mapping are implicitly defined by the shortest connection between the two object types. If the involved navigation properties should be explicitly specified they can be annotated with the corresponding templates, e.g. (FK_Orders_Shippers), shipper northw:customer ?customer and ?customer northw:shipper ?shipper.

Figure 6:
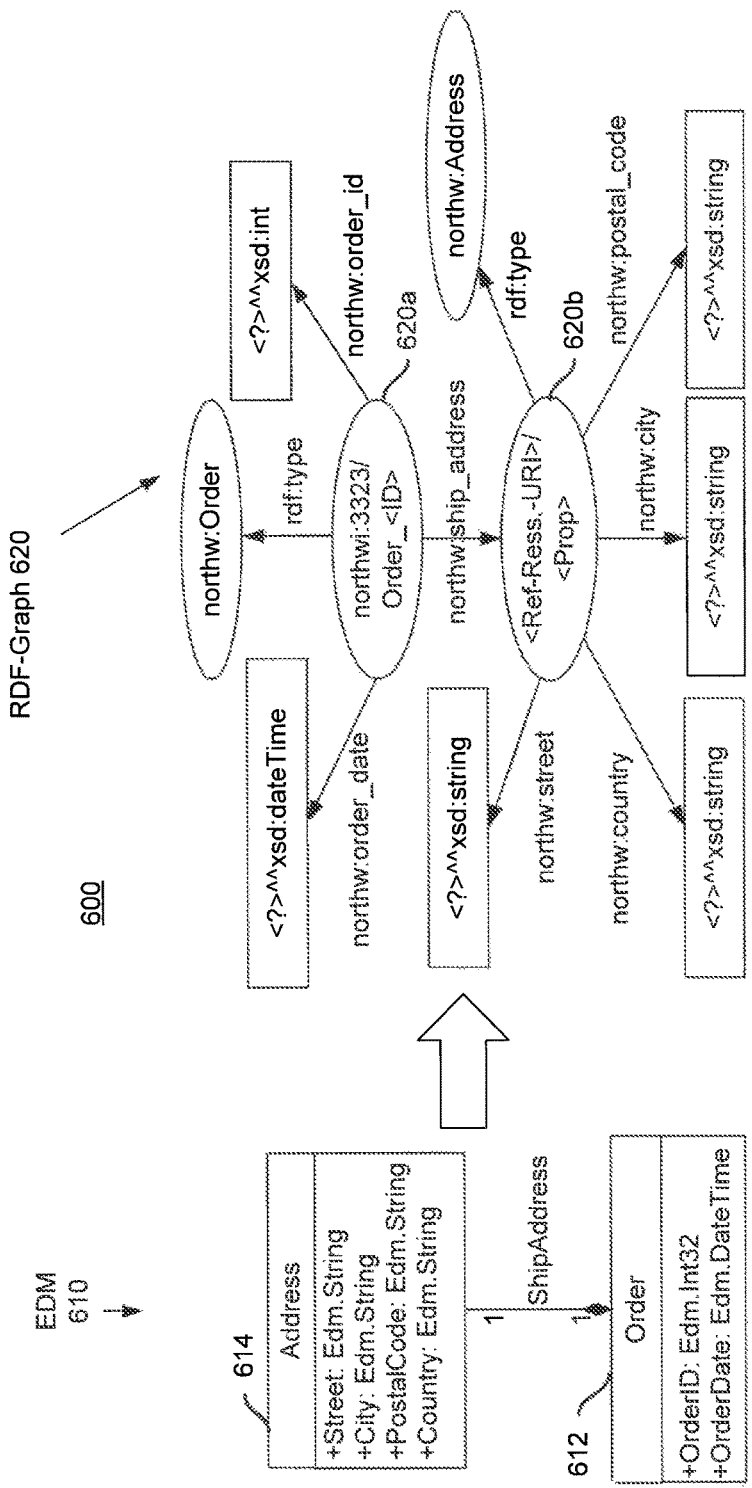
FIG. 6 depicts the mapping of properties of complex objects stored in a first format to a graph associated with a second format according to various embodiments.

According to some embodiments, the mapping may address complex types, which are a reduced form of object types. They may include a set of properties, but have no keys and/or navigation properties. Accordingly, instances of complex types cannot exist independently from their corresponding objects. FIG. 6 shows an example of an EDM 610 having an object 612 with such a complex type. As shown, object 612, which has a type Order, has a property ShipAddress 614 of a complex type Address. This is depicted in the diagram as a composition. Each Order-object 612 should be mapped to a resource 620a of the type northw:Order. The ShipAddress-property of an object which is an instance of the complex type Address is transformed to another resource 620b that has the type northw:Address.

By treating properties with a complex type like navigation properties, the mapping can be described with the constructs already introduced. Complex types can be semantically annotated the same way as object types. For instance, a variable ?address can be defined as part of the semantic extension of the Address complex type. This variable can then be used in the semantic extension of the Order object type to establish the connection between the two resources: sem:Mapping="?order rdf:type northw:Order ?order northw:ship_address ?address". The corresponding property is implicitly specified by the property type. If there are two or more properties that have the same complex type the corresponding properties can be marked explicitly as explained previously.

As already mentioned, the instances of complex types do not have keys according to some embodiments. Therefore, unique identifiers corresponding to the resource 620b that are created out of complex type 614 cannot have the same format as the unique identifiers (e.g., 324) created for resource templates mapped from objects (e.g., 612). For complex types such Address 614, the identifier must contain all the information that is necessary to retrieve the data within the EDM 610 framework. As the existence of a complex type instance depends on the existence a specific object (e.g., object 612), the identifier for resource 620b, for instance, must contain the information needed to retrieve the corresponding object 612. This information is already part of the identifier format introduced previously (i.e., identifier 324). Accordingly, the instance of the complex type 614 can be uniquely identified using the identifier of the associated object 612 plus the name of the corresponding property (e.g., ShipAddress). For example, in FIG. 6, the format of the identifier for resource 620b can be extended with the property name (EBNF): Base-URI, "/", entity-location-id, "/", resource-var, "_", entity-key, "/", property-name.

Figure 7:
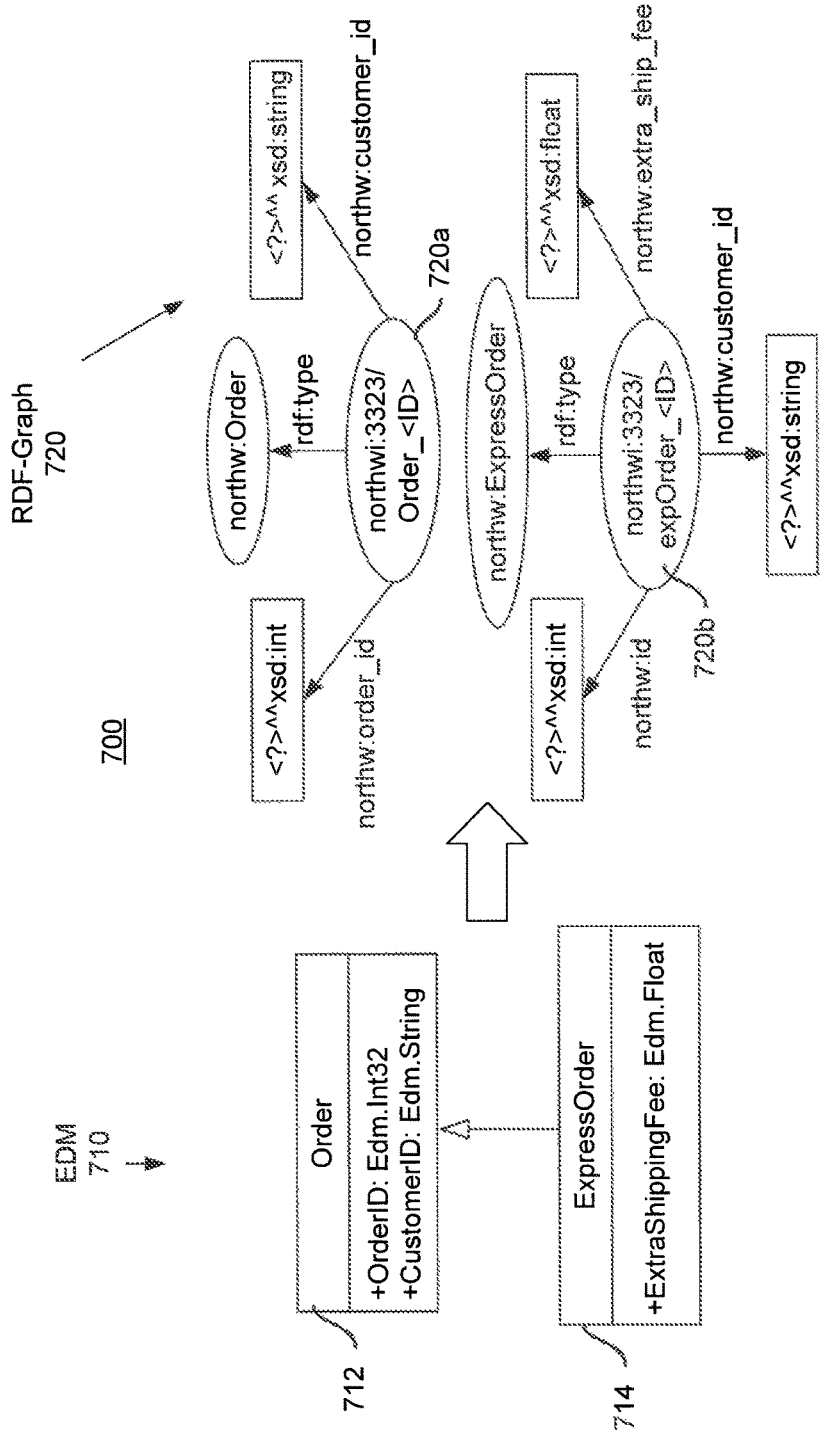
FIG. 7 depicts the mapping of properties of hierarchical objects stored in a first format to a graph associated with a second format according to various embodiments.

According to various embodiments, type hierarchies can be supported by the mapping. For instance, EDM provides constructs to define type hierarchies. Entity types and complex types can be derived from other types. Derived types inherit the properties and the keys from their parent types. It is not possible to override inherited properties. Multiple inheritance is not supported either. FIG. 7 depicts an EDM 710 having such a type hierarchy. As shown, EDM 710 contains an object 712 of a root type "order" and an object 714 of a derived type Express Order. The object 714 of type ExpressOrder is derived from the object type Order and extends it with an additional attribute that includes an ExtraShippingFee.

The simplest possible mapping of a type hierarchy is the mapping of all object types to, one resource template. Each property that is added by a derived type is mapped to an additional statement. For instance, the property "ExtraShippingFee" in derived type 714 could be added this way. This type of mapping can be described with the concepts already introduced, for example, in connection with FIG. 3A. To do so, the resource (e.g., 320) can be defined as part of the semantic annotation of the root type 712. The mappings in the derived types 714 can be defined with regard to this resource-variable.

According to some embodiments, different types of a type hierarchy can be mapped to more than one resource template. For instance, as shown in FIG. 7, the type "order" 712 can be mapped to resource 720a and the type Express Order 714 can be mapped to resource 720b. Object 712 of the type Order can be mapped to resource 720a, which has of the type northw:Order, as shown. ExpressOrder-object 714, on the other hand, can be mapped to resource 720b, which has the type northw:ExpressOrder. For the purposes of mapping object 714, the properties of the base type (i.e., OrderID and CustomerID in this case) need to be mapped to resource 720b as well as the additional property ExtraShippingFee. According various embodiments, the properties can be mapped to statements with different predicates based on the type of the object. For instance, the OrderID-property can be mapped to a statement with the predicate northw:order_id for Order-object 712 and to a statement with the predicate northw:id for ExpressOrder object 714, as shown.

In order to describe such a mapping, a resource-variable needs to be defined for each resource type in the semantic extensions of the corresponding object types. Different mappings of one property can be defined by referring to the corresponding variables, e.g.: sem:Mapping="?order northw:order_id $. ?expOrder northw:id $".

Figure 8:
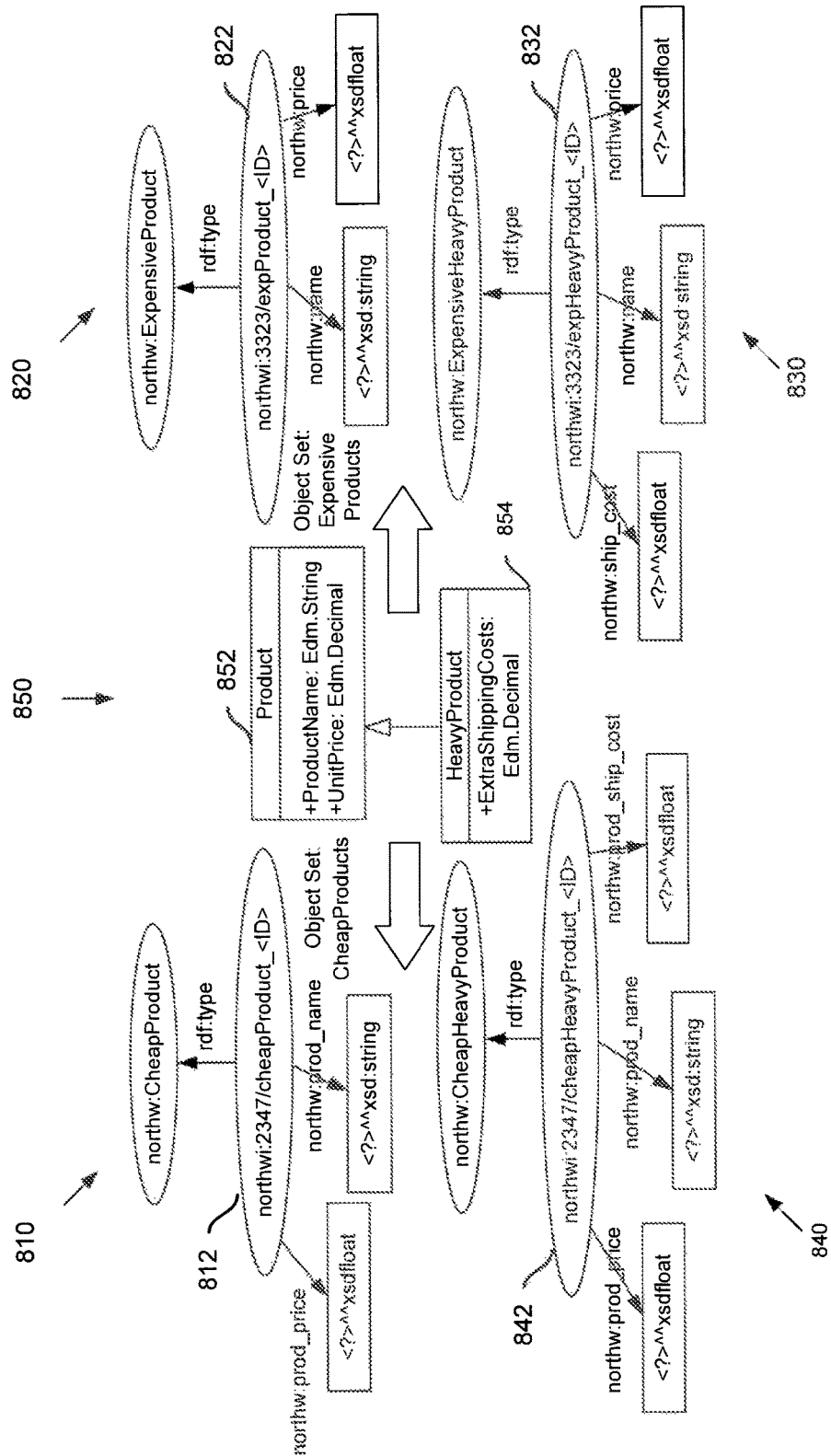
FIG. 8 depicts the mapping of properties of hierarchical objects stored in a first format to multiple graphs associated with a second format according to various embodiments.

FIG. 8 provides another example involving mapping of hierarchal types with regard to specific object sets that refer to these types result in an even more complex mapping, definition. For instance, as shown in FIG. 8, two object sets CheapProducts and Expensive Products" are provided. For instance, the object set for Cheap Products contains all products that cost less than $20. Products that cost more than $20 can be included in the ExpensiveProducts object set. The object type Product 852 has a derived type HeavyProduct 854. Objects of these two types 852 and 854 can be mapped to appropriate resource templates 810 and 830 according to their affiliation to the different object sets. For instance, if objects of the object types 852 and 854 were associated with the CheapProducts object sets, the object of the type 852 could be mapped to the resource 812 of the type northw:CheapProduct and the object of the type 854 could be mapped to resource 842 of type northw:CheapHeavyProduct. Similarly, if objects 852 and 854 were associated with the ExpensiveProducts object set, then they could be similarly mapped to the appropriate resource templates 820 and 830 associated with those sets. For instance, object 852 could be mapped to resource 822 and object 854 could be mapped to resource 832.

Since the mapping to the different resources types depends on the object sets it is not sufficient to semantically annotate only the object types. Instead the type definition must be part of the semantic extension of the object sets. For instance, in the example of FIG. 8, the corresponding EntitySet-element of the ExpensiveProducts object set might be annotated with the following attribute:

sem:Mapping="?expProduct rdf:type northw:ExpensiveProduct . ?expHeavyProduct rdf:type northw:ExpensiveHeavyProduct".

Figure 9:
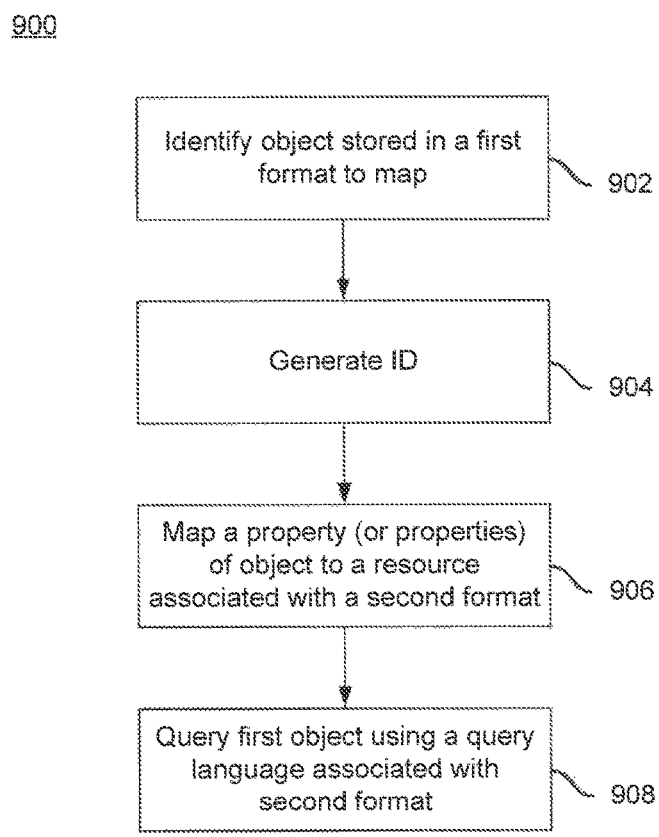
FIG. 9 is a flowchart depicting a method for mapping an object according to a resource according to various embodiments.

FIG. 9 is a flowchart depicting a method 900 for mapping an object according to a resource according to various embodiments. For instance, the process of FIG. 9 could be used to perform the mapping depicted in FIG. 3A. For ease of understanding, method 900 will be described with respect to FIG. 3A, but it should not be viewed as so limited to the embodiments depicted by FIG. 3A.

As shown in FIG. 9, at step 902, an object 310 stored in a first format (e.g., EDM, as described with respect to FIG. 3A) is identified for mapping to a resource associated with a second format. According to various embodiments the object 310 may have a particular type 312 associated with it and one or more properties (e.g., properties 314, 316, and 318).

At step 904, an identifier can be generated for the resource 324. the identifier must be unique to the resource 324 to which the object 310 has been mapped. According to some embodiments, the identifier may contain information that is sufficient to identify object 310 stored in the first format. For instance, the identifier might contain a hash of object 310's identifier or a hash of a part of the identifier in combination with the key of the object.

At step 906 a property of the object 310 can be mapped to the resource 324. For instance, as shown in FIG. 3A, the property of order ID 314 associated with object 310 can be mapped to an appropriate integer field 340 associated with the resource template.

At step 908, the mapping of the object 310 to the resource 324 can be employed to query the object 310 using a query language normally associated with a second format. For instance, in the example described with respect to FIG. 3A, the object 310 can be queried using SPARQL even though it is stored in EDM format because it has been mapped to a RDF-formatted resource 324.

Figure 10:
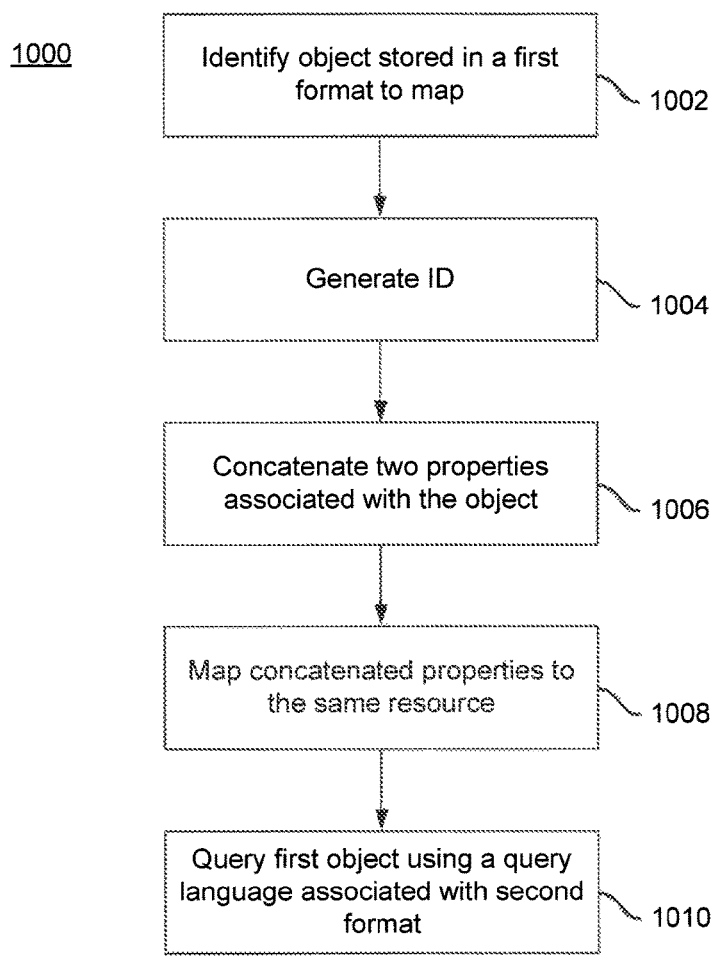
FIG. 10 is a flowchart depicting a method for mapping an object according to a resource according to various embodiments.

FIG. 10 is a flowchart depicting a method 1000 for mapping an object according to a resource according to various embodiments. For instance, the process 1000 of FIG. 10 could be used to perform the mapping depicted in FIG. 3A. For ease of understanding, method 1000 will be described with respect to FIG. 3A, but it should not be viewed as so limited to the embodiments depicted by FIG. 3A.

As shown in FIG. 10, at step 1002, an object 310 stored in a first format (e.g., EDM, as described with respect to FIG. 3A) is identified for mapping to a resource associated with a second format. According to various embodiments the object 310 may have a particular type 312 associated with it and one or more properties (e.g., properties 314, 316, and 318).

At step 1004, an identifier can be generated for the resource 324. Preferably the identifier is unique to the resource 324 to which the object 310 has been mapped. According to some embodiments, the identifier may contain information that is sufficient to identify object 310 stored in the first format. For instance, the identifier might contain a hash of object 310's identifier or a hash of a part of the identifier in combination with the key of the object.

At step 1006, the two properties associated with the object can be concatenated. For instance, if the object 310 were of type Employee Name, it might include two properties: First Name and Last Name. According to various embodiments the two properties could be concatenated into a single string comprising both of the first and last names.

At step 1008, the concatenated property of the object 310 can be mapped to the resource 324. For instance, as shown in FIG. 3A, the property of order ID 314 associated with object 310 can be mapped to an appropriate integer field 340 associated with the resource template.

At step 1010, the mapping of the object 310 to the resource 324 can be employed to query the concatenated property of object 310 using a query language normally associated with a second format. For instance, in the example described with respect to FIG. 3A, the object 310 can be queried using SPARQL even though it is stored in EDM format because it has been mapped to, a RDF-formatted resource 324.

Figure 11:
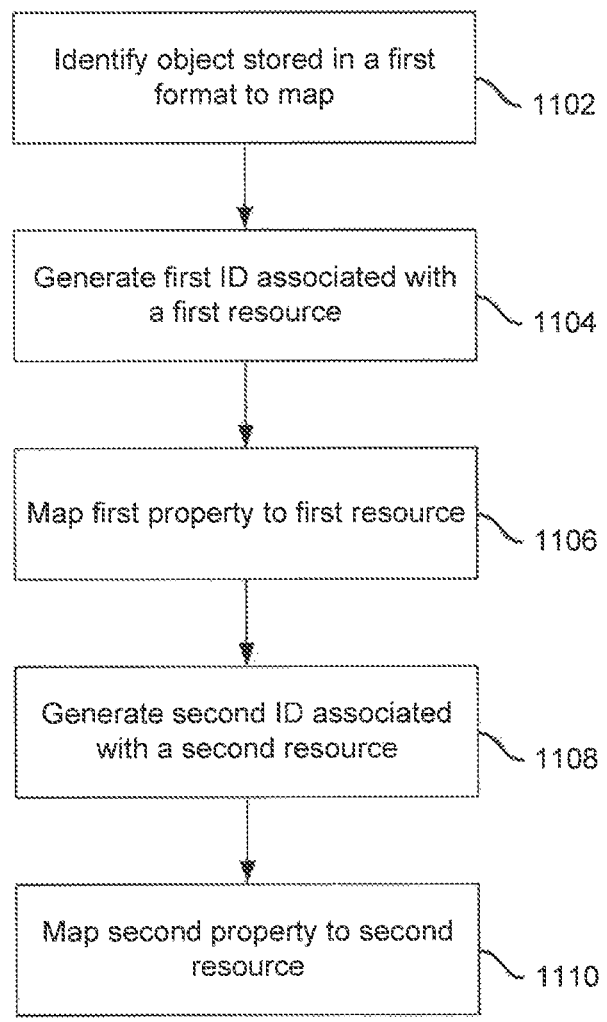
FIG. 11 is a flowchart depicting a method for mapping an object according to a resource according to various embodiments.

FIG. 11 is a flowchart depicting a method 1100 for mapping an object according to a resource according to various embodiments. For instance, the process 1100 of FIG. 11 could be used to perform the mapping depicted in FIG. 3B. For ease of understanding, method 1100 will be described with respect to FIG. 3B, but it should not be viewed as so limited to the embodiments depicted by FIG. 3B.

As shown in FIG. 11, at step 1102, an object 310 stored in a first format (e.g., EDM, as described with respect to FIG. 3B) is identified for mapping to a resource associated with a second format. According to various embodiments the object 310 may have a particular type 312 associated with it and one or more properties (e.g., properties 314, 316, and 318).

At step 1104, an identifier can be generated for a first resource 324a. Preferably the identifier is unique to the resource 324a to which the object 310 has been mapped. According to some embodiments, the identifier may contain information that is sufficient to identify object 310 stored in the first format. For instance, the identifier might contain a hash of object 310's identifier or a hash of a part of the identifier in combination with the key of the object.

At step 1106, a first property associated with object 310 can be mapped to the first resource 324a, substantially as described above. For instance, as shown in FIG. 3B, one (or all) of properties 314, 316, or 318 could be mapped to resource 324a.

At step 1108, a second ID associated with a second resource can be generated. The second ID can be unique from the first ID and also may contain information that is sufficient to identify object 310 stored in the first format. For instance, the identifier might contain a hash of object 310's identifier or a hash of a part of the identifier in combination with the key of the object.

At step 1110, a second property of object 310 can be mapped to the second resource 324b. For instance, as shown in FIG. 3B, one (or both) of properties 342 and 344 could be mapped to resource 324b.

Figure 12:
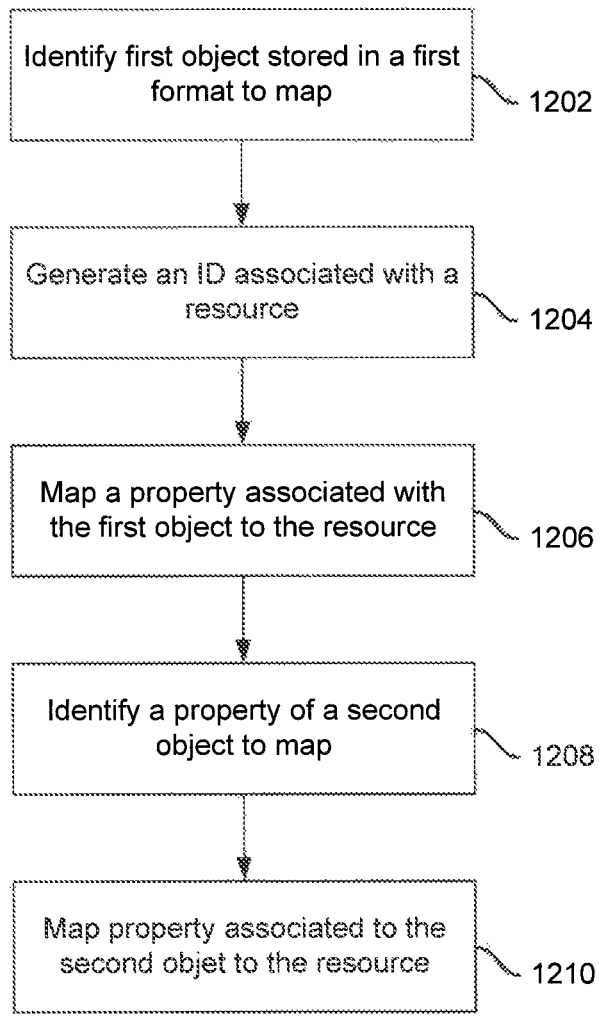
FIG. 12 is a flowchart depicting a method for mapping an object according to a resource according to various embodiments.

FIG. 12 is a flowchart depicting a method 1200 for mapping an object according to a resource according to various embodiments. For instance, the process 1200 of FIG. 12 could be used to perform the mapping depicted in FIG. 4. For ease of understanding, method 1200 will be described with respect to FIG. 4, but it should not be viewed as so limited to the embodiments depicted by FIG. 4.

As shown in FIG. 12, at step 1202, an object 412 stored in a first format (e.g., EDM, as described with respect to FIG. 4) is identified for mapping to a resource associated with a second format. According to various embodiments the object 412 may have a particular type (e.g., "Shipper") and one or more properties associated with it.

At step 1204, an identifier can be generated for the resource 422. The identifier must be unique to the resource 422 to which the object 412 has been mapped. According to some embodiments, the identifier may contain information that is sufficient to identify object 412 stored in the first format. For instance, the identifier might contain a hash of object 412's identifier or a hash of a part of the identifier in combination with the key of the object.

At step 1206 a property associated with the first object can be mapped to the resource 422. For instance, as shown in FIG. 4, the property "ShipperID" can be mapped to the integer field 424 associated with resource 422. Similarly the property "Phone" can be mapped to the string field 426 associated with resource 422.

At step 1208, a property of a second object 416 can be identified to map to the resource 422. At step 1210, the identified property of the second object 416 can be mapped to the resource 422. For instance, as shown in FIG. 4, the "CompanyName" property from object 416 can be mapped to the string field 428 associated with resource 422.

Figure 13:
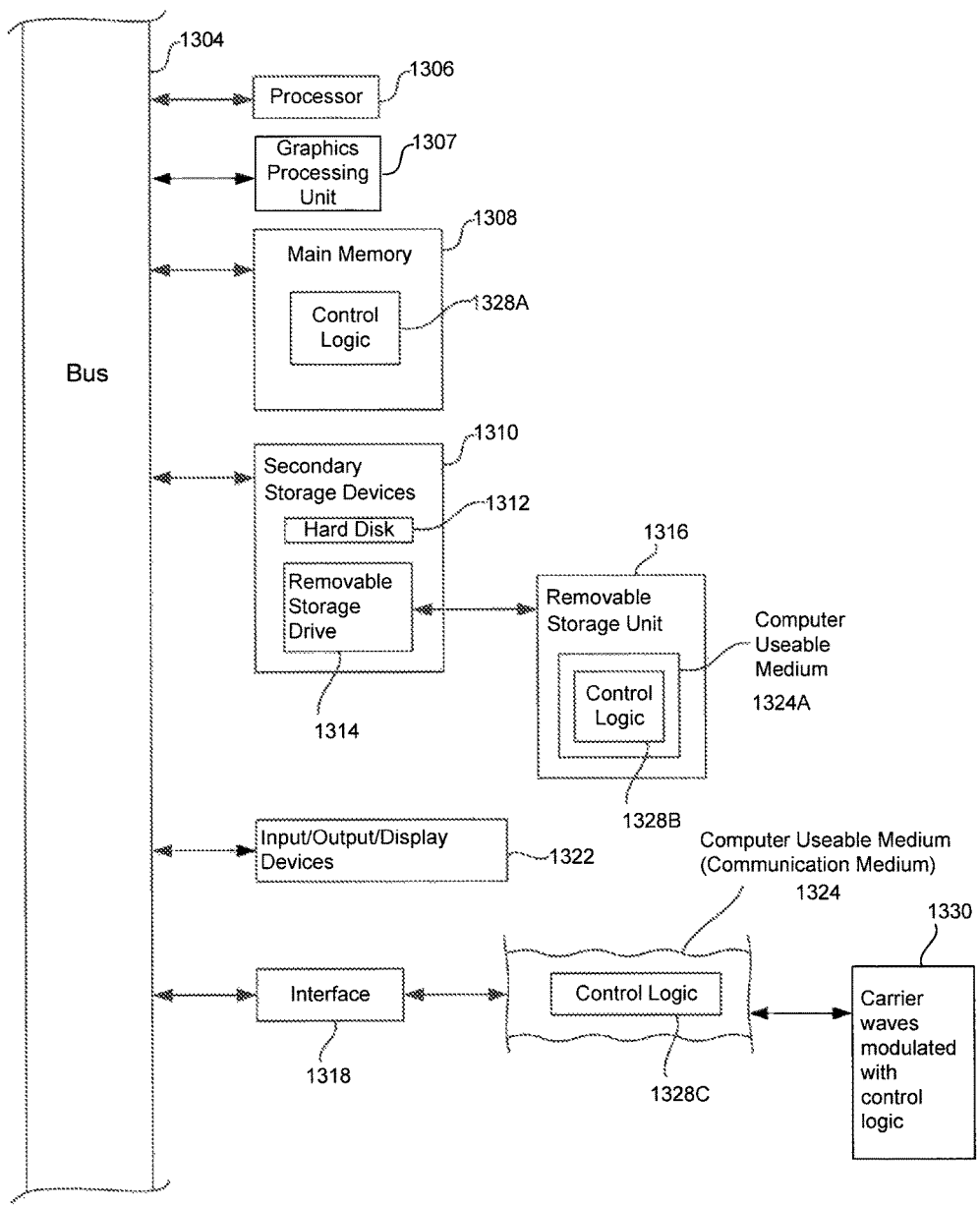
FIG. 13 is a function block diagram depicting a computer according to various embodiments.

In an embodiment, the system and components described herein are implemented using well known computers, such as computer 1300 shown in FIG. 13. For instance, any of the mappings depicted in FIGS. 3-8 or the processes for mapping depicted in FIGS. 9-12 could be performed by a computer or computers such as computer 1300.

Computer 1300 may comprise any commercially available computer capable of performing the functions described herein, such as computers available from International Business Machines, Apple, Sun, HP, Dell, Digital, Cray, etc.

Computer 1300 includes one or more processors (also called central processing units, or CPUs), such as a processor 1306. Processor 1306 may comprise one or more processors. The processor 1306 is connected to a communication bus 1304. Processors 1306 may include any conventional or special purpose processor, including, but not limited to, digital signal processor (DSP), field programmable gate array (FPGA), and application specific integrated circuit (ASIC).

Computer 1300 includes one or more graphics processing units (also called GPUs), such as GPU 1307. GPU 1307 is a specialized processor that executes instructions and programs selected for complex graphics and mathematical operations in parallel.

Computer 1300 also includes a main or primary memory 1308, such as random access memory (RAM). The primary memory 1308 has stored therein control logic 1328A (computer software), and data.

Computer 1300 also includes one or more secondary storage devices 1310. The secondary storage devices 1310 include, for example, a hard disk drive 1312 and/or a removable storage device or drive 1314, as well as other types of storage devices, such as memory cards and memory sticks. The removable storage drive 1314 represents a floppy disk drive, a magnetic tape drive, a compact disk drive, an optical storage device, tape backup, etc.

The removable storage drive 1314 interacts with a removable storage unit 1316. The removable storage unit 1316 includes a computer useable or readable storage medium 1324 having stored therein computer software 1328B (control logic) and/or data. Removable storage unit 1316 represents a floppy disk, magnetic tape, compact disk, DVD, optical storage disk, or any other computer data storage device. The removable storage drive 1314 reads from and/or writes to the removable storage unit 1316 in a well-known manner.

Computer 1300 also includes input/output/display devices 1322, such as monitors, keyboards, pointing devices, touchscreen displays, etc.

Computer 1300 further includes a communication or network interface 1318. The network interface 1318 enables the computer 1300 to communicate with remote devices. For example, the network interface 1318 allows computer 1300 to communicate over communication networks or mediums 1324B (representing a form of a computer useable or readable medium), such as LANs, WANs, the Internet, etc. The network interface 1318 may interface with remote sites or networks via wired or wireless connections.

Control logic 1328C may be transmitted to and from computer 1300 via the communication medium 1324B. More particularly, the computer 1300 may receive and transmit carrier waves (electromagnetic signals) modulated with control logic 1330 via the communication medium 1324B.

Any apparatus or manufacture comprising a computer useable or readable medium having control logic (software) stored therein is referred to herein as a computer program product or program storage device. This includes, but is not limited to, the computer 1300, the main memory 1308, the secondary storage devices 1310, the removable storage unit 1316 and the carrier waves modulated with control logic 1330. Such computer program products, having control logic stored therein that, when executed by one or more data processing devices, cause such data processing devices to operate as described herein, represent embodiments.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Additionally, it should be understood that none of the examples or explanations contained herein are meant to convey that the described embodiments have been actually reduced to practice.

The breadth and scope of the present disclosure should not be limited by any of the above-described exemplary embodiments, but should be defined only in accordance with the following claims and their equivalents.

What is claimed is:

1. A method, comprising:
identifying an entity data model (EDM) object of a first object type within a set of EDM objects to be mapped, wherein the EDM object is represented using a common schema definition language (CSDL), and the EDM object comprises a first identifier and a first object property, wherein the first object property is extended using a semantic attribute that extends the CSDL and maps the first object type to a second object type associated with a resource description framework (RDF) of a second object type;
generating a second identifier for an RDF resource of the second object type, wherein the second identifier of the RDF resource is generated based on the first identifier of the EDM object and an identifier of the set of EDM objects, and the second identifier is configured to allow derivation of the first identifier of the EDM object;
mapping the first object property of the EDM object to the RDF resource based on the second identifier of the RDF resource and the semantic mapping; and querying the EDM object using a query language associated with the RDF format based on the mapping.

2. The method of claim 1, wherein the second identifier contains information configured to allow retrieval of the first object.

3. The method of claim 2, further comprising retrieving the first object using the information contained in the second identifier.

4. The method of claim 1, wherein the first object has a second object property associated with it.

5. The method of claim 4, further comprising mapping the second object property to a second resource, wherein the second resource is associated with a third identifier.

6. The method of claim 4, further comprising mapping the second object property to the first resource.

7. The method of claim 6, wherein the second object property is mapped to the first resource by concatenating it with the first object property.

8. The method of claim 1, further comprising identifying a second object to be mapped.

9. The method of claim 8, further comprising mapping an object property associated with the second object to the first resource.

10. The method of claim 8, further comprising mapping an object property associated with the second object to a second resource.

11. The method of claim 1, wherein the second identifier comprises a hash of the first identifier.

12. The method of claim 1, wherein generating the second identifier comprises:
inserting a hash value corresponding to the first object into the second identifier.

13. The method of claim 1, wherein the first format is an entity data model (EDM) format, the second format is a resource description framework (RDF;) format, and the query language is in a SPARQL Protocol and RDF Query Language (SPARQL) format.

14. The method of claim 1, wherein the second identifier uniquely identifies the first resource.

15. The method of claim 1, wherein the semantic attribute comprises a graph pattern comprising a triple pattern.

16. The method of claim 15, wherein the mapping the first object property to the first resource comprises:
mapping the first object property to the first resource by replacing a portion of the graph pattern with the second identifier.

17. The method of claim 16, wherein the mapping comprises:
replacing an order of variables in the triple pattern by an automatically generated resource identifier.

18. A computer system, comprising:
a memory; and
one or more processors configured to:
identify an entity data model (EDM) object of a first object type within a set of EDM objects to be mapped, wherein the EDM object is represented using a common schema definition language (CSDL), and the EDM object comprises a first identifier and a first object property, wherein the first object property is extended using a semantic attribute that extends the CSDL and maps the first object type to a second object type associated with a resource description framework (RDF) of a second object type;
generate a second identifier for an RDF resource of the second object type, wherein the second identifier of the RDF resource is generated based on the first identifier of the EDM object and an identifier of the set of EDM objects, and the second identifier is configured to allow derivation of the first identifier of the EDM object;
map the first object property of the EDM object to the RDF resource based on the second identifier of the RDF resource and the semantic mapping; and
query the EDM object using a query language associated with the RDF format based on the mapping.

19. The system of claim 18, wherein the second identifier contains information configured to allow retrieval of the first object.

20. The system of claim 19, wherein the one or more processors are further configured to retrieve the first object using the information contained in the second identifier.

21. The system of claim 18, wherein the first object has a second object property associated with it.

22. The system of claim 21, wherein the one or more processors are further configured to map the second object property to a second resource, wherein the second resource is associated with a third identifier.

23. The system of claim 21, wherein the one or more processors are further configured to map the second object property to the first resource.

24. The system of claim 23, wherein the one or more processors are configured to map the second object property to the first resource by concatenating the second object property with the first object property.

25. The system of claim 18, wherein the one or more processors are further configured to identify a second object to be mapped.

26. The system of claim 25, wherein the one or more processors are further configured to map an object property associated with the second object to the first resource.

* * * * *

UNITED STATES PATENT AND TRADEMARK OFFICE
CERTIFICATE OF CORRECTION

PATENT NO. : 10,360,232 B2  
APPLICATION NO. : 13/936623  
DATED : July 23, 2019  
INVENTOR(S) : Marc Kirchhoff Page 1 of 1

It is certified that error appears in the above-identified patent and that said Letters Patent is hereby corrected as shown below:

On the Title Page

In items (12), and (72), please replace "Kirchoff" with --Kirchhoff--.

Signed and Sealed this  
First Day of October, 2019

Andrei Iancu  
*Director of the United States Patent and Trademark Office*